C. W. FORKER.
SPUD MACHINE.
APPLICATION FILED JULY 25, 1919.

1,362,409.

Patented Dec. 14, 1920.
4 SHEETS—SHEET 1.

INVENTOR.
CHARLES W. FORKER.
BY Hazard & Miller
ATTORNEYS.

C. W. FORKER.
SPUD MACHINE.
APPLICATION FILED JULY 25, 1919.
1,362,409. Patented Dec. 14, 1920.
4 SHEETS—SHEET 2.
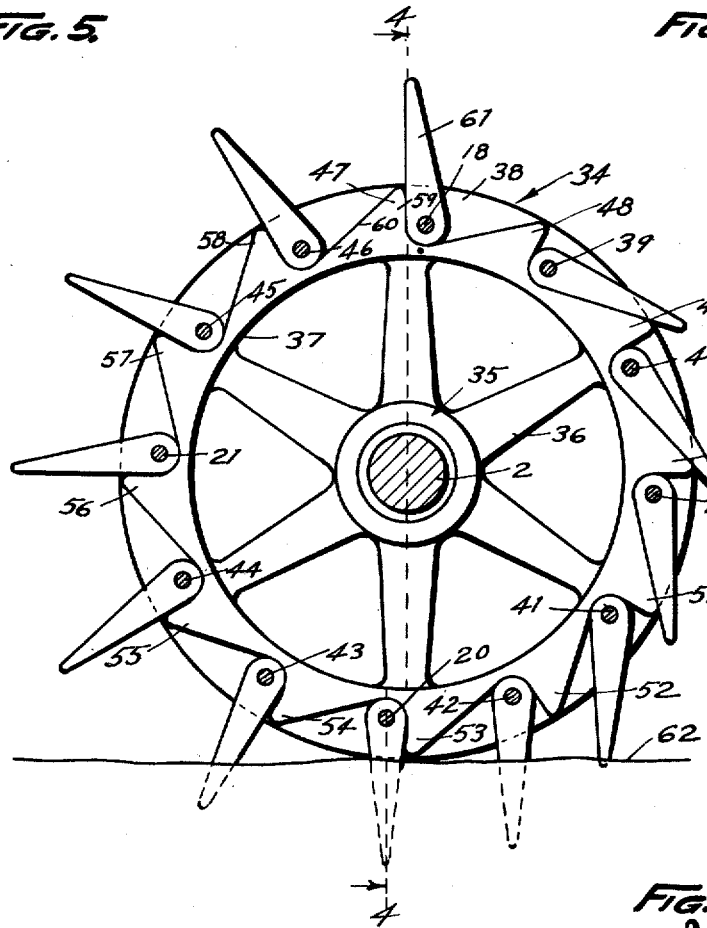
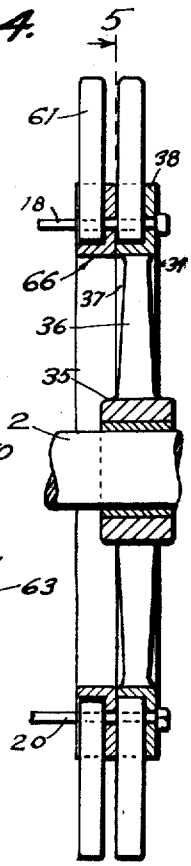
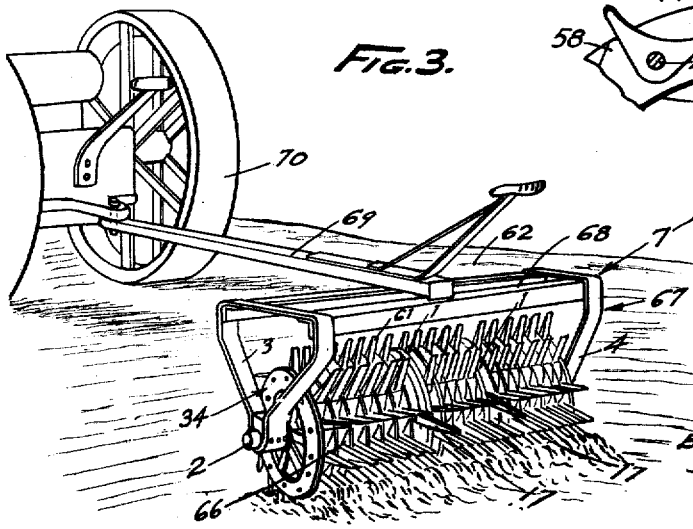
INVENTOR.
CHARLES W. FORKER
BY Hazard & Miller
ATTORNEYS.

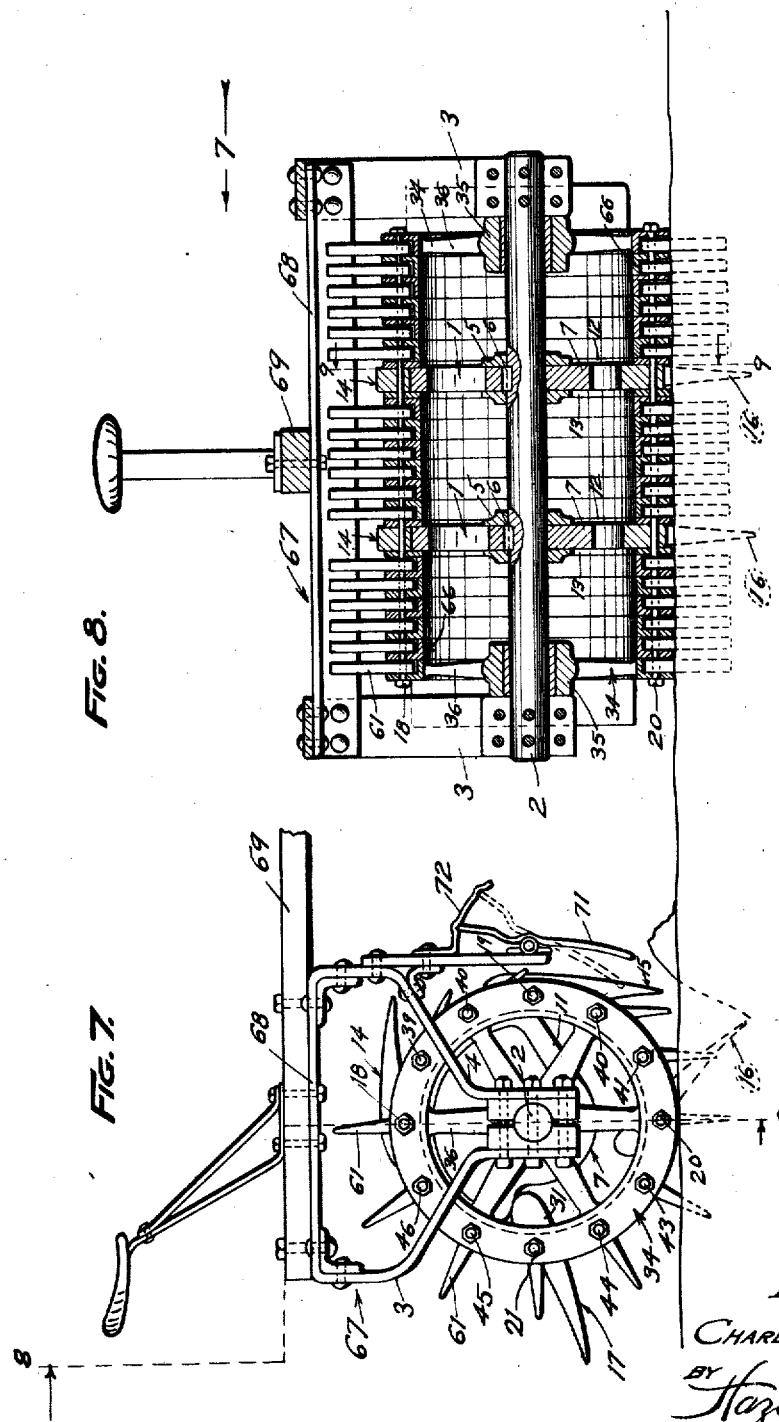

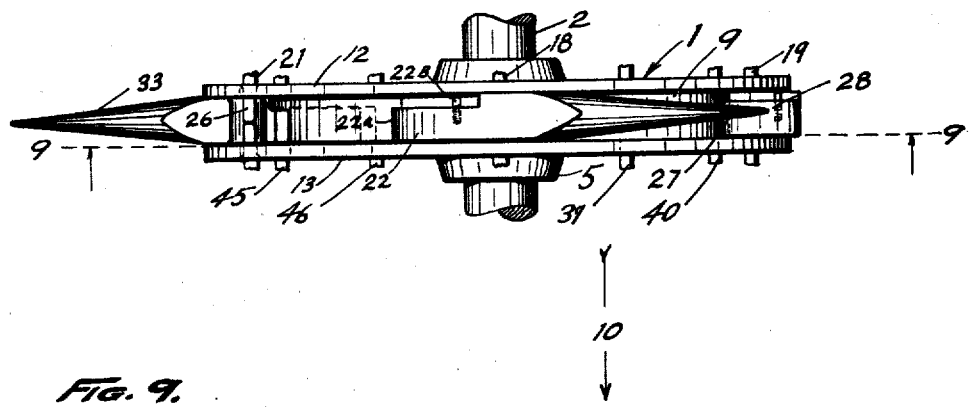
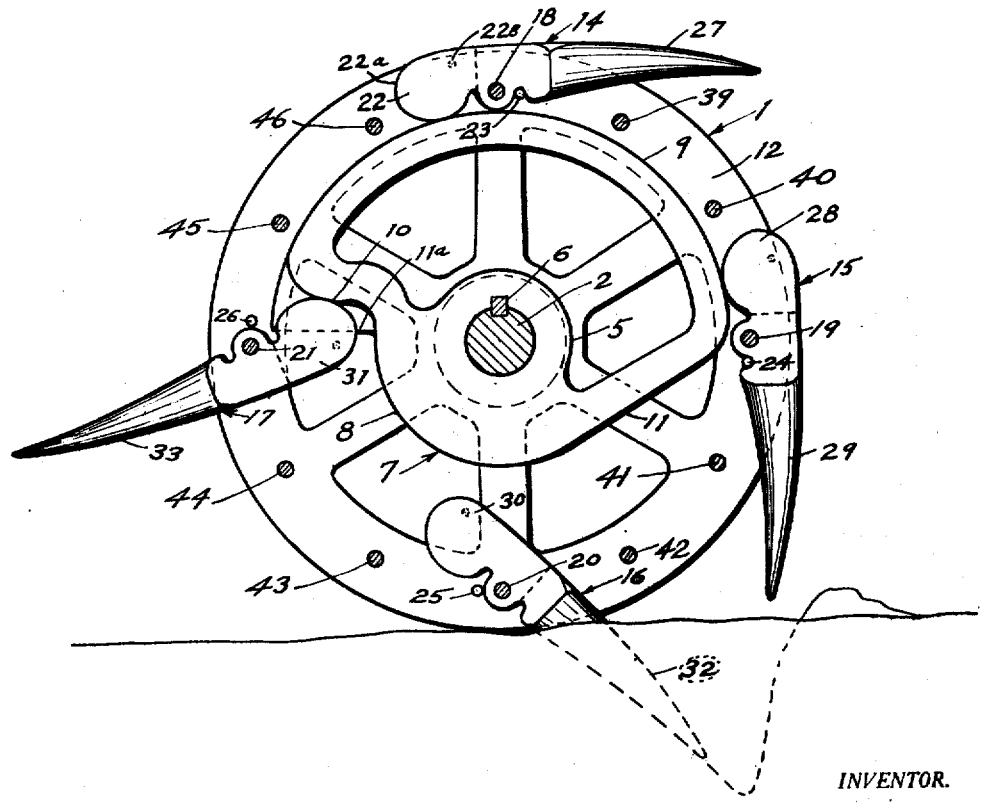

UNITED STATES PATENT OFFICE.

CHARLES W. FORKER, OF LOS ANGELES, CALIFORNIA.

SPUD-MACHINE.

1,362,409.     Specification of Letters Patent.     Patented Dec. 14, 1920.

Application filed July 25, 1919. Serial No. 313,357.

*To all whom it may concern:*

Be it known that I, CHARLES W. FORKER, a citizen of the United States, residing at Los Angeles, in the county of Los Angeles and State of California, have invented new and useful Improvements in Spud-Machines, of which the following is a specification.

My object is to make an improved spudding machine, and my invention consists of the novel features herein shown, described and claimed.

Specifically my invention relates to that class of farm implements adapted for producing holes in the top soil and extending into the sub-soil to permit the water from rain or irrigation to pass through the top soil and into the sub-soil.

Fig. 3 is an isometric perspective of a single acting spudding machine embodying the principles of my invention, the spudding machine being attached to a tractor ready for use, parts of the tractor being broken away.

Fig. 4 is a fragmentary diametrical sectional detail across the main shaft and longitudinally of the shaft, the view being taken on the line 4—4 of Fig. 5.

Fig. 5 is a cross section on the line 5—5 of Fig. 4 and looking in the direction indicated by the arrows.

Fig. 6 is a fragmentary view analogous to Fig. 5 and showing cultivator teeth substituted for the spudding teeth.

Fig. 7 is a fragmentary end elevation of the spudding machine shown in Fig. 3, the view being taken looking in the direction indicated by the arrows 7 in Figs. 3 and 8.

Fig. 8 is a longitudinal sectional detail on the same plane as Fig. 4 and taken on the line 8—8 of Fig. 7.

Fig. 9 is an enlarged cross sectional detail on the lines 9—9 of Figs. 1, 8 and 10, and looking in the direction indicated by the arrows.

Fig. 10 is an edge view of the parts shown in Fig. 9 as seen looking in the direction indicated by the arrow 10.

Figure 1:
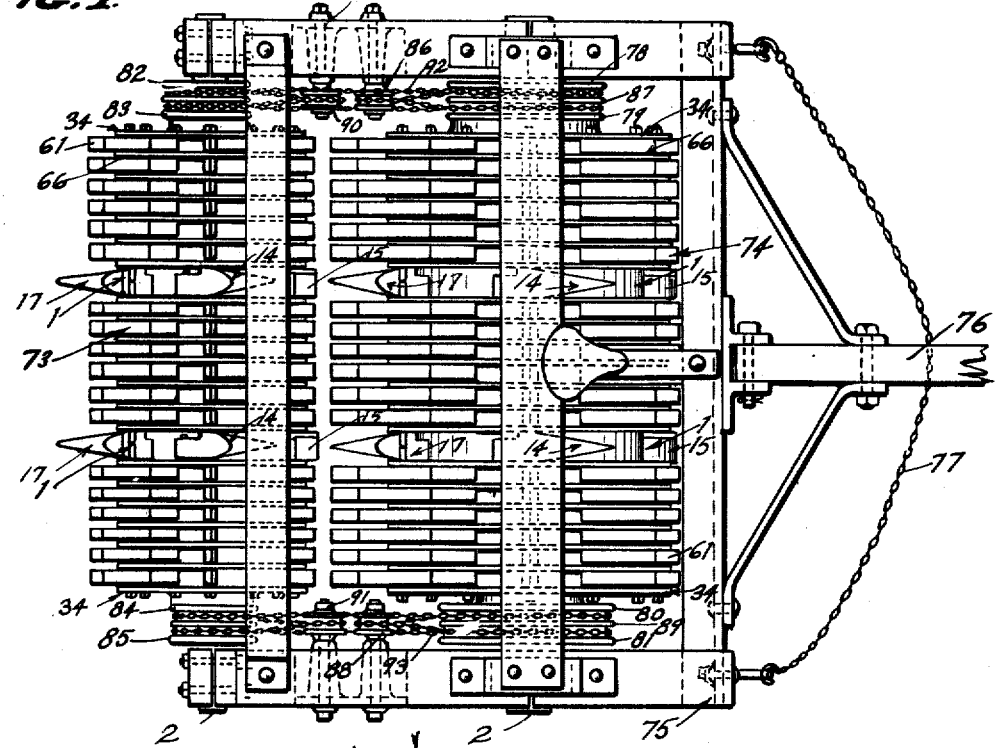
Figure 1 is a top plan view of a double acting spudding machine embodying the principles of my invention, and looking in the direction indicated by the arrow 1 in Fig. 2.

The details of a feathering spudder 1 are as follows:

The shaft 2 is held against rotation by being fixed in the frame bars 3 and 4. The hub 5 is fixed upon the shaft 2 by a key 6. The cam 7 is rigid with the hub 5. The cam 7 has an inner concentric peripheral portion 8, an outer concentric peripheral portion 9, a portion 10 connecting one end of the portion 8 to the adjacent end of the portion 9 and an offset portion 11$^a$ beside the portion 10 connecting the concentric peripheral portion 8 to the concentric peripheral portion 9, a portion 11 connecting the other end of the portion 8 to the other end of the portion 9. The flanges 12 and 13 are annular flat rings having pin holes. The feathering spuds 14, 15, 16 and 17 fit between the rims of the flanges 12 and 13 and are pivotally mounted upon pins 18, 19, 20 and 21 fixed in the flanges 12 and 13.

The feathering spud 14 has a weighted head 22 bearing against the cam 7. The weighted head 22 has a face 22$^a$ bearing against the portions 8, 10, 9 and 11, of the cam 7 and offset to be out of the path of the portion 11$^a$ of the cam 7, and the head 22 has a pin 22$^b$ extending laterally into the plane of the portion 11$^a$ of the cam 7 so that when the spud 14 has passed through three-quarters of a turn from the position shown in Fig. 9, the pin 22$^b$ will engage the portion 11$^a$ of the cam 7 and cause a quick action of the spur from its radial position to its tangential position so that the point of the spud will pass under the frame. Stop and spacing pins 23, 24, 25 and 26 are formed integral with the flanges 12 and 13 near the pivot pins 18, 19, 20 and 21 so as to space the flanges apart and allow the spuds to run freely and so that when the spud 14 is in position with the pivot pin 18 directly above the shaft 2 the stop pin 23 holds the point 27 projecting outwardly and forwardly at a tangent to the periphery of the flanges 12 and 13, and at this time the head 22 is bearing upon the portion 9 of the cam 7 and the spud is held in position until the flanges 12 and 13 make a quarter turn and then the point 27 is in a vertical position almost ready to enter the ground with the flanges 12 and 13 upon the ground. Continued forward movement of the machine causes the weighted head 22 to tilt the point 27 forwardly so that the point will strike the ground at an incline and straighten up as the machine moves forward. During this operation the head 22 leaves the portion 9 of the cam and passes along the portion 11, and the spud is tilted in the ground an enlarges the hole. Continued forward movement of the machine causes the head 22 to leave the portion 11 and causes the spud to move away from the pin 23 and then the point 27 may lag and the spud will turn upon the pin 18 until the spud has been withdrawn from the ground and is passing upwardly, and a three-quarter turn from the starting position will bring the head 22 into engagement with the portion 10 of the cam, and continued forward movement will cause the point 27 to swing upwardly and over until the pin 23 engages the spud at the opposite side of the pivot 18 from its position at the half turn. The object is to give the spuds a wabbling motion in going into and out of the ground and to bring the points 27 inwardly at their upper positions so they will pass under the frame.

The spud 15 has a head 28 and a point 29 similar to the head 22 and the point 27, and the spuds 16 and 17 have heads 30 and 31 and points 32 and 33.

The spuds 15, 16 and 17 operate the same as the spud 14.

Referring to Figs. 4 and 5 the details of a pivoted spudder 34 are as follows:

The hub 35 is rotatably mounted on the shaft 2 and has spokes 36 extending radially and a rim 37 at the outer ends of the spokes 36. An annular flange 38 extends outwardly at one side of the rim 37. The pins 18, 19, 20 and 21 extend through the flange 38 and pins 39 and 40 are located between the pins 18 and 19, and pins 41 and 42 between the pins 19 and 20, and pins 43 and 44 between the pins 20 and 21, and pins 45 and 46 between the pins 21 and 18. The pins 18, 19, 20, 21, 39, 40, 41, 42, 43, 44, 45 and 46 are heavy rods extending from one end of the machine to the other parallel with the shaft 2 evenly spaced apart and concentric to the shaft.

Lugs 47, 48, 49, 50, 51, 52, 53, 54, 55, 56, 57 and 58 extend one way from the flange 38, each of said lugs having a radial face 59 and a tangential face 60. The pivoted spuds 61 are mounted upon the pins 18, 19, 20, 21, 39, 40, 41, 42, 43, 44, 45 and 46 so that the spuds will bear against the radial faces 59 and extend outwardly beyond the flanges 30 in radial planes or turn upon the pins and bear against the faces 60 and project outwardly tangentially to the periphery of the flange 38.

The spuds 61 operate by gravity from their radial positions to their tangential positions when free. The flange 38 runs upon the surface 62 and when the machine is going forwardly and the flange 38 rotating in the direction indicated by the arrow 63 the spuds 61 at the front of the axle 2 will hang downwardly, and when the pins pass below the level of the axle the spuds will be in vertical positions and continued forward movement will bring the spuds to the surface 62 of the ground with the spuds 61 straight up and down as shown by the spuds 61 connected to the pin 41, and continued forward movement will press the spud down into the ground as shown by the spuds connected to the pins 42 and 20. After the pin 20, for instance, passes the vertical line of the shaft 2 continued movement will withdraw the spud from the ground, and as the spud is withdrawn from the ground it will press against the face 59 of the lug 47 and kick up the ground as shown by the spud connected to the pin 43.

In Fig. 6 I have shown cultivator teeth 64 inserted upon the pins in the seat 65 against the faces 59 and 60 and projecting slightly beyond the periphery of the flange 38, the object being to remove the spuds 61 and apply the cultivator teeth 64 when desired to make a cultivator.

The pivoted spudders 66 are identical in construction with the pivoted spudders 34 except that the hub 35 and spokes 36 are omitted. The spudders 34 are placed upon the ends of the shaft 2 inside of the frame bars 3 and 4, and the pivoted spudders 66 are placed inside of the spudders 34 and mixed up with the feathering spudders 1 as desired.

Fig. 7 shows an end elevation of the drum and the frame and trunnion bearings for carrying the same and also indicates by the spud 16, shown in dotted lines, how the spuds move downwardly and are pressed into the ground and pulled out of the ground providing a properly formed hole.

In Figs. 1, 3 and 8 I have shown two feathering spudders 1, several pivoted spudders 66, and a spudder 34 at each end. It is obvious that the spudders may be mixed up as desired, and if the shaft 2 is long, spudders 34 may be distributed along the shaft wherever desired so as to brace the long rods.

The pin 18, 19, 20, 21, 39, 40, 41, 42, 43, 44, 45 and 46 inserted through the two feathering spudders 1, the several pivoted spudders 66, and the two pivoted spudders 34 have heads upon one end and nuts upon the other end, and the nuts are drawn tight to press the frames together and produce in effect a heavy drum. The spuds 14, 15, 16 and 17 and the spuds 61 work freely upon the pins in their respective seats and operate like grouters to engage the ground and rotate the drum.

The single acting spudding machine 67 shown in Fig. 3 has a single shaft 2 and a single collection of spuds and spudders.

The frame 68 connects the frame bars 2 and 3 rigidly together. The tongue 69 is connected to the frame 68 and the tongue 69 may be connected to a tractor 70 or to any other suitable power. In this construction as the machine is drawn forwardly the spuds engage the ground and rotate and operate the parts.

The frame 68 is high enough to allow the pivoted spuds 61 to pass below the frame and not high enough to allow the spuds 14, 15, 16 and 17 to pass in their extended positions, and so the parts are arranged to tilt the spuds over during the last quarter of the revolution from the position shown relative to the pin 21 in Fig. 9 to the position shown relative to the pin 18 so that the spuds will pass freely under the frame.

When it is desired to pull the machine across a field without complete action the pivoted bars 71 shown in Fig. 7 have their lower ends swung inwardly to engage the spuds 14, 15, 16 and 17 upon the second quarter of the revolution so as to swing the points 27, 29, 32 and 33 inwardly on the down stroke, so that the points will not penetrate the ground directly as in the regular operation. The spring bars 72 are adapted to hold the bars 71 out of action or in action.

Figure 2:
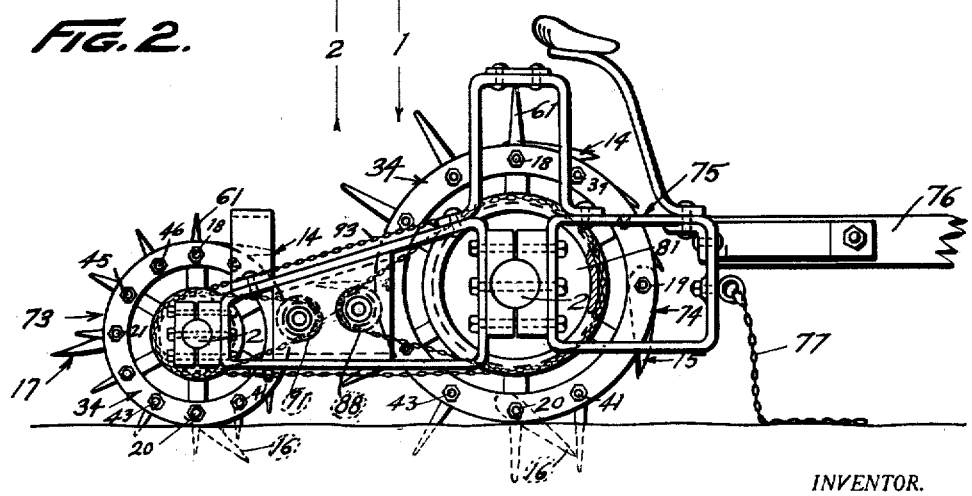
Fig. 2 is a side elevation looking in the direction indicated by the arrow 2 in Fig. 1.

Referring to Figs. 1 and 2, the double acting spudding machine consists of two single acting spudding cylinders 73 and 74. The spudding cylinder 73 is the same as shown and described in connection with the single acting spudding machine 61, and the spudding cylinder 74 is identical in construction with the spudding cylinder 73 except that it is made upon a larger and heavier scale and is larger essentially in diameter.

The spudding cylinder 74 is mounted in front of the spudding cylinder 73 in a frame 75 having a tongue 76 and a draft chain 77. Chain sheaves 78 and 79 are fixed upon one end of the cylinder 74, and similar chain sheaves 80 and 81 are fixed upon the other end of the cylinder 74. Chain sheaves 82 and 83 are fixed upon one end of the cylinder 73 in line with the sheaves 78 and 79, and chain sheaves 84 and 85 are fixed upon the other end of the cylinder 73 in line with the sheaves 80 and 81.

An idler sheave 86 is mounted behind the sheaves 78 and 79 in line with the rim 87 between the sheaves 78 and 79. An idler sheave 88 is mounted behind the sheaves 80 and 81 in line with the rim 89 between the sheaves 80 and 81. In a like manner idler sheaves 90 and 91 are mounted in front of the sheaves 82 and 83 and 84 and 85.

An endless chain 92 connects the sheaves 78 and 79 to the sheaves 82 and 83, said chain passing twice around the sheaves and once around the idlers 86 and 90 as required to cause the chain to travel straight. In a like manner the endless chain 93 connects the sheaves 80 and 81 to the sheaves 84 and 85, said chain passing twice around the sheaves and once around the idlers 88 and 91.

The object of the specific chain construction is to connect the cylinder 73 to the cylinder 74 so that with the cylinder 74 rolling upon the ground and spudding the ground the cylinder 73 will rotate faster than the travel as required to chop up and pulverize the ground.

The feathering spudders 1 may be omitted where the top soil is shallow, or any desired number of feathering spudders may be used in proportion to the pivoted spudders where the top soil is deep and requires long spuds to reach to the sub-soil.

If desired the spuds may all be omitted from the cylinder 73 and the cultivator teeth 64 substituted, then the spudding cylinder 74 will do the spudding work, and the cylinder 73 will pulverize the soil ready for planting the crop.

Any form of the spudding machine is to be made very heavy and strong and the machine is especially useful on land which dries and forms a crust almost impervious to water, and the action of the machine is to punch holes in the crust and break up the crust and punch holes down through the crust into the sub-soil, so that any water applied to the surface will penetrate into the sub-soil. The machine depends for its action entirely upon the contact with the ground through the spuds for rotation, and of course, the cylinders and framework must be heavy enough to force the spuds into the ground, and in the double acting machine the driving spuds and cylinders, that is the large cylinder 74 must be heavy enough not only to drive itself by contact with the ground, but heavy enough to drive the small cylinder 73 faster than the travel.

Thus I have produced a single or double acting spudding machine consisting of one or two cylinders having a mixture of pivoted and feathering spuds, the double acting machine consisting of a large cylinder and a smaller cylinder, the smaller cylinder being connected to the large cylinder to be driven faster than the travel.

Various changes may be made without departing from the spirit of my invention as claimed.

I claim:

1. In a spudding machine, a drum, a plurality of spuds pivoted on said drum, a cam and pins on said drum for engaging said spuds to cause them to enter the ground vertically and to enable said spuds to leave the ground freely.

2. In a spudding machine, a frame, a drum upon which said frame is journaled, a plurality of spuds pivotally mounted on said drum to enter the ground vertically and to pass out of the ground radial to the center of said drum, said spuds being arranged in groups longitudinally of the drum, and a plurality of feathering spuds mounted on the periphery of said drum between said groups of spuds.

3. In a spudding machine, a frame, a drum upon which said frame is journaled, a plurality of spuds pivotally mounted on said drum to enter the ground vertically and to pass out of the ground radial to the center of said drum, said spuds being arranged in groups longitudinally of the drum, a plurality of feathering spuds mounted on the periphery of said drum between said groups of spuds, and means for enabling said feathering spuds to enter the ground vertically and to leave the ground freely.

4. In a spudding machine, a frame, a drum upon which said frame is journaled, a plurality of spuds pivotally mounted on said drum to enter the ground vertically and to pass out of the ground radial to the center of said drum, said spuds being arranged in groups longitudinally of the drum, a plurality of feathering spuds mounted on the periphery of said drum between said groups of spuds, means for enabling said feathering spuds to enter the ground vertically and to leave the ground freely, and means for turning said feathering spuds over forwardly when they have withdrawn from the ground.

5. In a spudding machine, a frame, a drum upon which said frame is journaled, rows of bearings arranged longitudinally on the periphery of said drum, rows of spuds arranged respectively in said rows of bearings, and a rod extending through each row of bearings, and the row of spuds arranged therein for pivoting said spuds on said drum in operative position.

6. In a spudding machine, a frame; a shaft journaled in said frame; wheel members secured on said shaft near the ends thereof; ring members surrounding said shaft between said wheel members and arranged in groups; feathering spud wheel members secured on said shaft between said groups; bearings arranged in longitudinal rows on the periphery of said end wheel members, said ring members and said feathering spud members; spuds in the bearings of said end wheel members and said ring members; feathering spuds in the bearings of said feathering spud wheel members; a rod extending through each row of said bearings and the row of spuds therein; and means on the ends of said rods for engaging the end wheel members and drawing said end wheel members, said ring members and said feathering spud ring members together and pivoting said spuds in operative position.

In testimony whereof I have signed my name to this specification.

CHARLES W. FORKER.